(12) United States Patent
Donahoe

(10) Patent No.: US 8,307,858 B2
(45) Date of Patent: Nov. 13, 2012

(54) METHOD OF MAKING A DECORATIVE ARTICLE

(76) Inventor: Eleanor M. Donahoe, Naples, FL (US)

( * ) Notice: Subject to any disclaimer, the term of this patent is extended or adjusted under 35 U.S.C. 154(b) by 673 days.

(21) Appl. No.: 12/583,380

(22) Filed: Aug. 20, 2009

(65) Prior Publication Data

US 2011/0045315 A1  Feb. 24, 2011

(51) Int. Cl.
*B21F 45/00* (2006.01)
*B21F 3/00* (2006.01)
(52) U.S. Cl. .................................... 140/71 R; 140/102
(58) Field of Classification Search .............. 140/71 R, 140/102.5, 102, 92.1; 29/896.4, 896.41, 29/896.43; 47/41.01; 428/10, 542.2; 362/122
See application file for complete search history.

(56) References Cited

U.S. PATENT DOCUMENTS

| 3,308,005 | A | * | 3/1967 | Pinnecker | 47/41.01 |
| 5,207,758 | A | * | 5/1993 | Royalty | 428/10 |
| 5,878,788 | A | * | 3/1999 | Gurry | 140/71 R |

* cited by examiner

*Primary Examiner* — Teresa M Ekiert
(74) *Attorney, Agent, or Firm* — Ronald C. Capossela

(57) ABSTRACT

A method of making a floral halo 14 comprising the steps of forming a central support 5 by bending a wire 7 around a plurality of pin groups 3 positioned upon a special jig 1 thereby creating a central support 5 having a plurality of butterfly loops 4 for fastening flower bundles 13 thereto in such a manner that each successive flower bundle 13 covers the bent butterfly loop 4 of each preceding flower bundle 13.

9 Claims, 4 Drawing Sheets

METHOD OF MAKING A DECORATIVE ARTICLE

CROSS REFERENCE TO RELATED APPLICATIONS

None

FEDERALLY SPONSORED RESEARCH

None

SEQUENCE LISTING

None

BACKGROUND OF THE INVENTION

This invention relates to a method of manually making a decorative article which secures distinct elements thereof in various continuous lengths. These decorative articles can take the shape of a floral halo for use on a person's head, a Christmas wreath, a garland for use on a Christmas tree, a lei, and decorative lengths to be used on chair backs, chuppas, archways, doorways at special events and wedding ceremonies. In the prior art, these decorative articles are made by a process that is slow and requires more material than the instant invention. The prior art process requires the steps of first cutting a floral wire to the desired length and thereby creating a support wire for the floral bundles, fastening a plurality of floral bundles by attaching these floral bundles to the support wire by additional wire and then wrapping the wired floral bundle with floral tape to cover the floral wiring wrapping. This process is repeated for each floral bundle wired to the central wire until the decorative article is complete. This process is teadious because it requires the person to constantly cut wire to secure the flower bundles to the center wire without regard to their placement on the support. A piece of tape has to be used to cover the connecting wire after the wire has fastened the flower bundle to the wire. This floral tape restricts the flow of moisture from the flowers in the bundle. The number of floral bundles is dependent on the overall length of the decorative device and its use.

SUMMARY OF THE INVENTION

My invention provides for a method of manually making a decorative article which is faster and more efficient than other prior art methods.

Another advantage of my invention is that it is equally adapted to both real and synthetic distinct elements.

Another advantage of my invention is that it creates a novel method of forming a central support for the decorative article.

Another advantage of my invention is that it provides for a unique method of securing the distinct elements to the central support without the use of a separate fastening means; i.e. separate wire and securing tape.

Another advantage of my invention is that the decorative article can be made in advance of a special event and can be stored in water in a refrigerated atmosphere thereby extending the life thereof.

Another advantage of my invention is that it eliminates the use of securing tape for each flower bundle which seals off the flow of moisture thereto.

The advantages of my invention will become apparent from the study of the description and the accompanying drawings. It should be understood that variations may be made in the details and general features of the design concept without departing from the spirit and scope of the invention.

DETAILED DESCRIPTION OF THE PREFERRED EMBODIMENT

Figure 1:
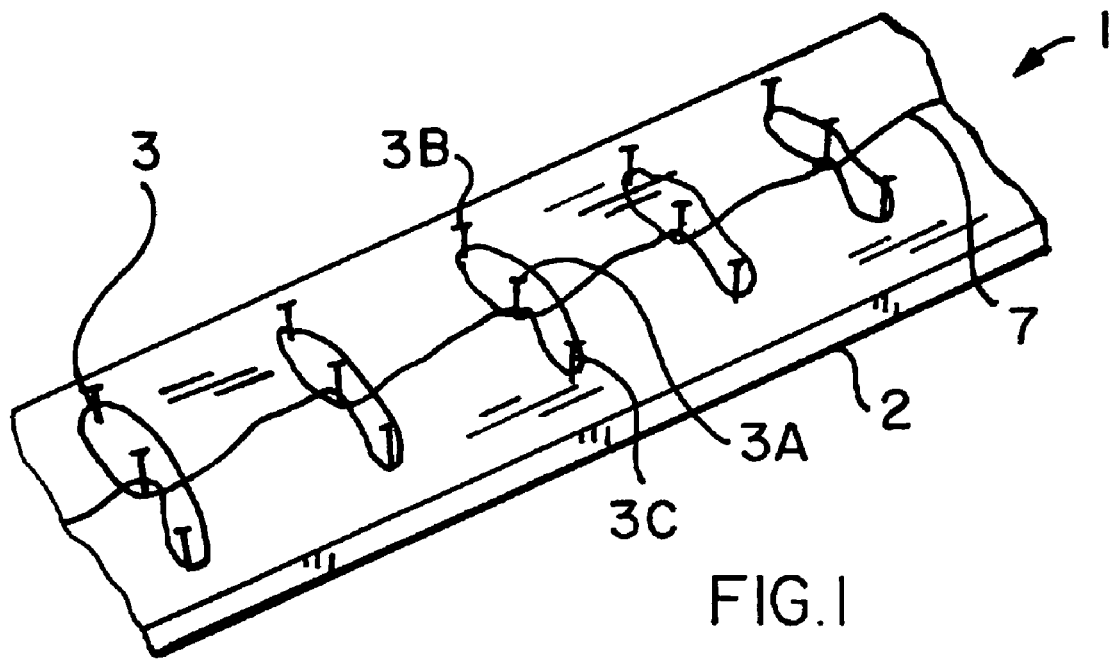
FIG. 1 is a perspective view of the special jig having a plurality of pin groups arranged in a particular pattern of the instant invention for forming the central support by bending a floral wire about the pin groups.

FIG. 1 shows a perspective view of a special jig 1 in the form of a piece of wood 2 having a plurality of groups of pins 3 positioned longitudinally along its length. The wood jig 1 is at least eighteen inches long and can be a 2×4, a 1×4 or any other size that can be adapted for the desired purpose. Each pin group 3 has three pins 3A, 3B and 3C positioned transversely across the jig 1 and each pin group 3 is positioned longitudinally along the jig 1 and spaced approximately an inch and a half apart. Wire 7 from a previous pin group is bent around pin 3A and directed to and bent around pin 3C and directed to and bent around pin 3B and directed back to pin 3A and bent therearound and directed to the next pin group. It is understood that the direction that the person making the decorative article takes in bending the wire is dependent on whether he/she is left handed or right handed. The person could easily bend the wire around 3A and then 3B and then 3C if desired. Once the central support 5 is removed from the jig 1 the person bends the wire 7 back over itself at the point where bent portion from 3A is located.

Figure 2:
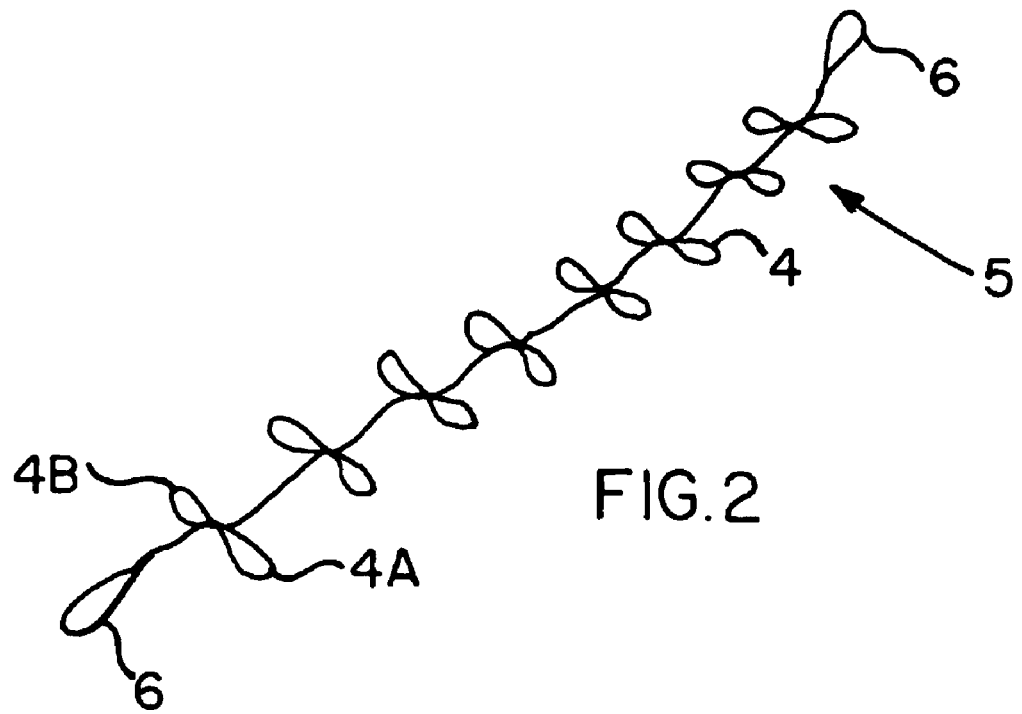
FIG. 2 is a perspective view of the finished central support.

FIG. 2 shows the finished continuous central support 5 having a plurality of butterfly loops 4 spaced longitudinally along the central support 5. The number of butterfly loops 4 is dependent on the length of the decorative article being made. Each butterfly loop 4 has a pair of wings 4A and 4B. At each end of the central support 5, the wire 7 is wrapped about itself to form end loops 6.

Figure 3:
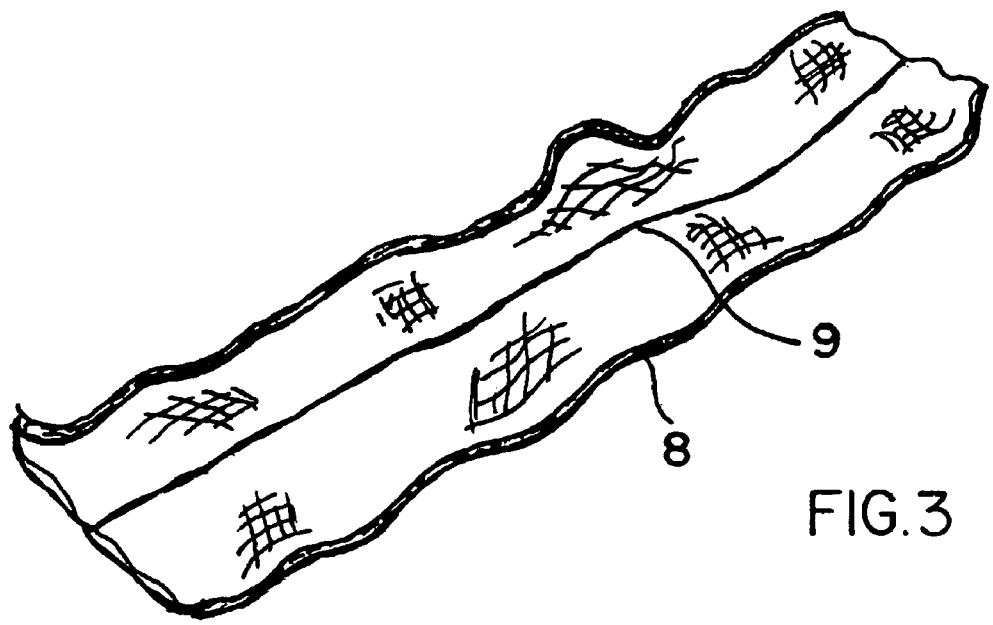
FIG. 3 is a perspective view of a gathered decorative ribbon with center basting stitch.

FIG. 3 is a perspective view of a floral ribbon 8 with a basting stitch 9 substantially along the center line thereof. This gathers the ribbon 8 to create a ruffled effect.

Figure 4:
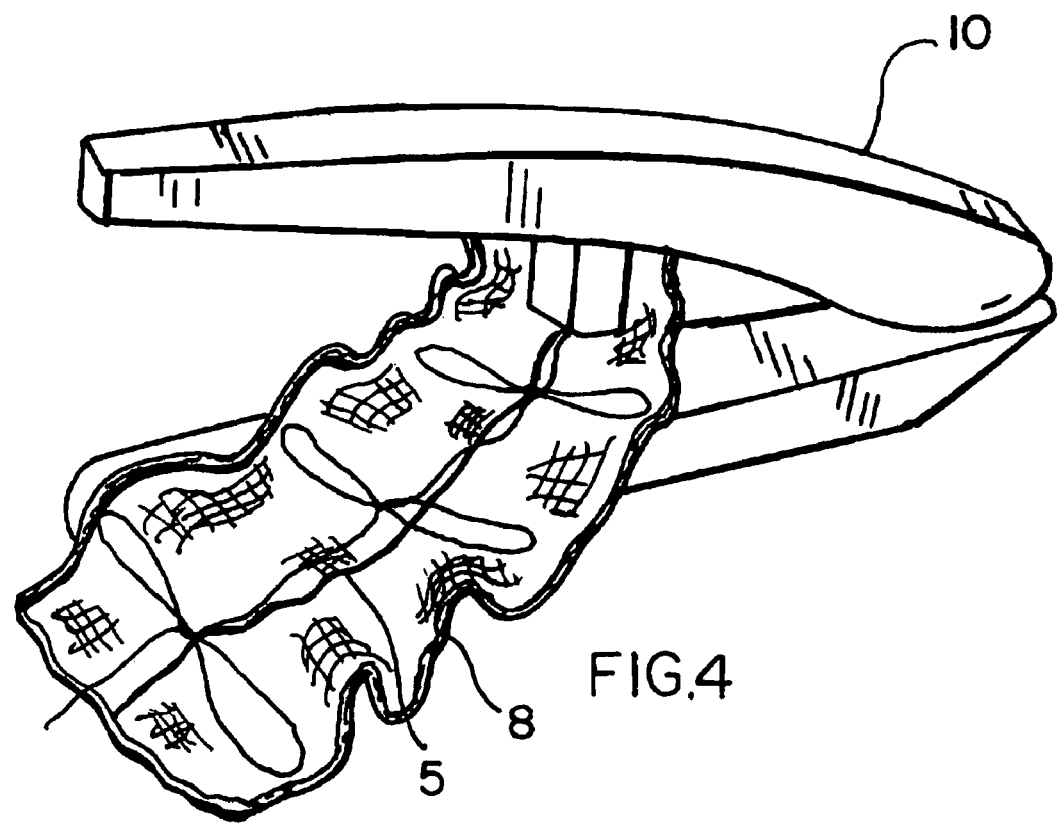
FIG. 4 is a perspective view of the central support being fastened to the basted ribbon.

FIG. 4 is a perspective view of the central support 5 being fastened to the gathered ribbon 8 by stapler 10. It is to be understood that any method of fastening the ribbon 8 to central support 5 would suffice. For example, it could be glued, sewn or any other method that would maintain a strong bond between the central support 5 and the ribbon 8.

Figure 5:
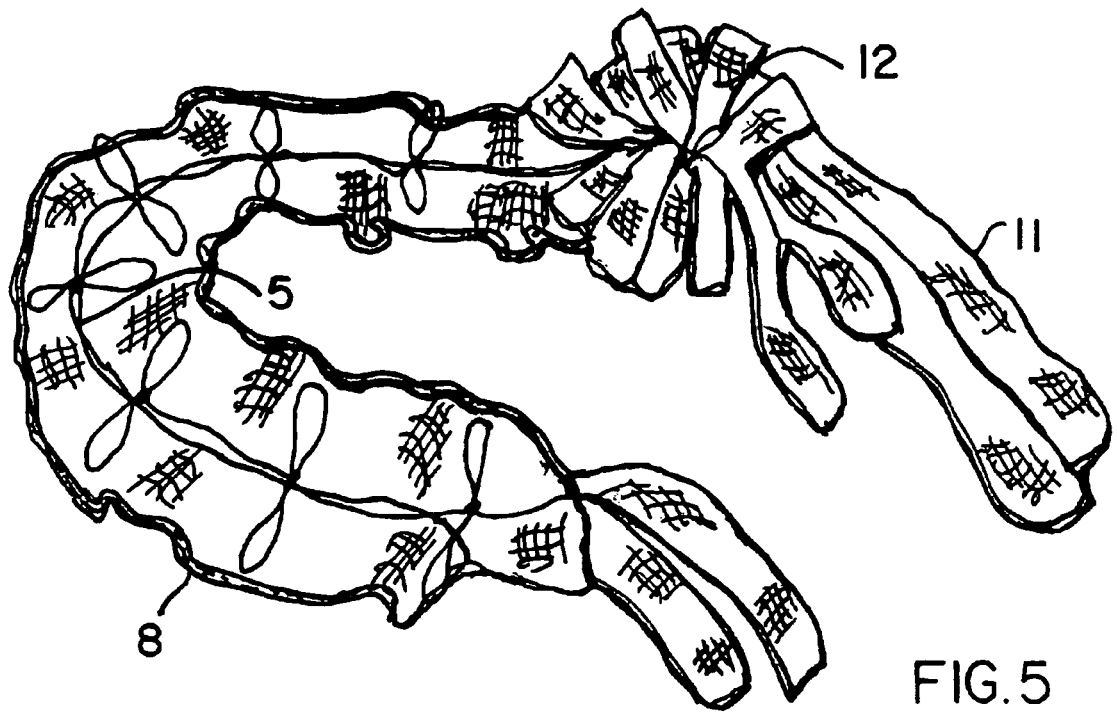
FIG. 5 is a perspective view of the ribbon/central support combination with end streamers and bow.

FIG. 5 is a perspective view of the central support 5 and ribbon 8 with end streamers 11 and decorative bow 12.

Figure 6:
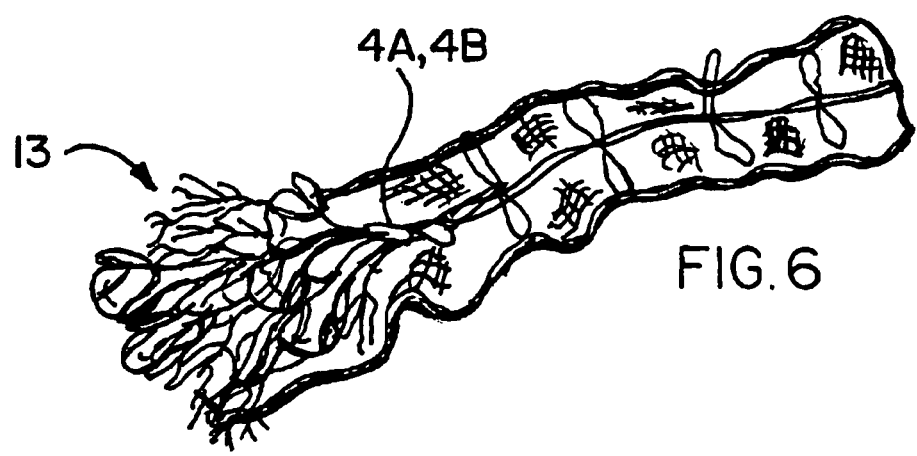
FIG. 6 is a perspective view of the flower bundles being fastened to the central/support according to the instant invention.

FIG. 6 is a perspective view of a flower bundle 13 being fastened to the central support 5 on ribbon 8 by bending the wings 4A and 4B of the butterfly loops 4 around the stems of the flower bundles 13. This step is repeated for each successive flower bundle 13 and corresponding to each butterfly loop 4.

Figure 7:
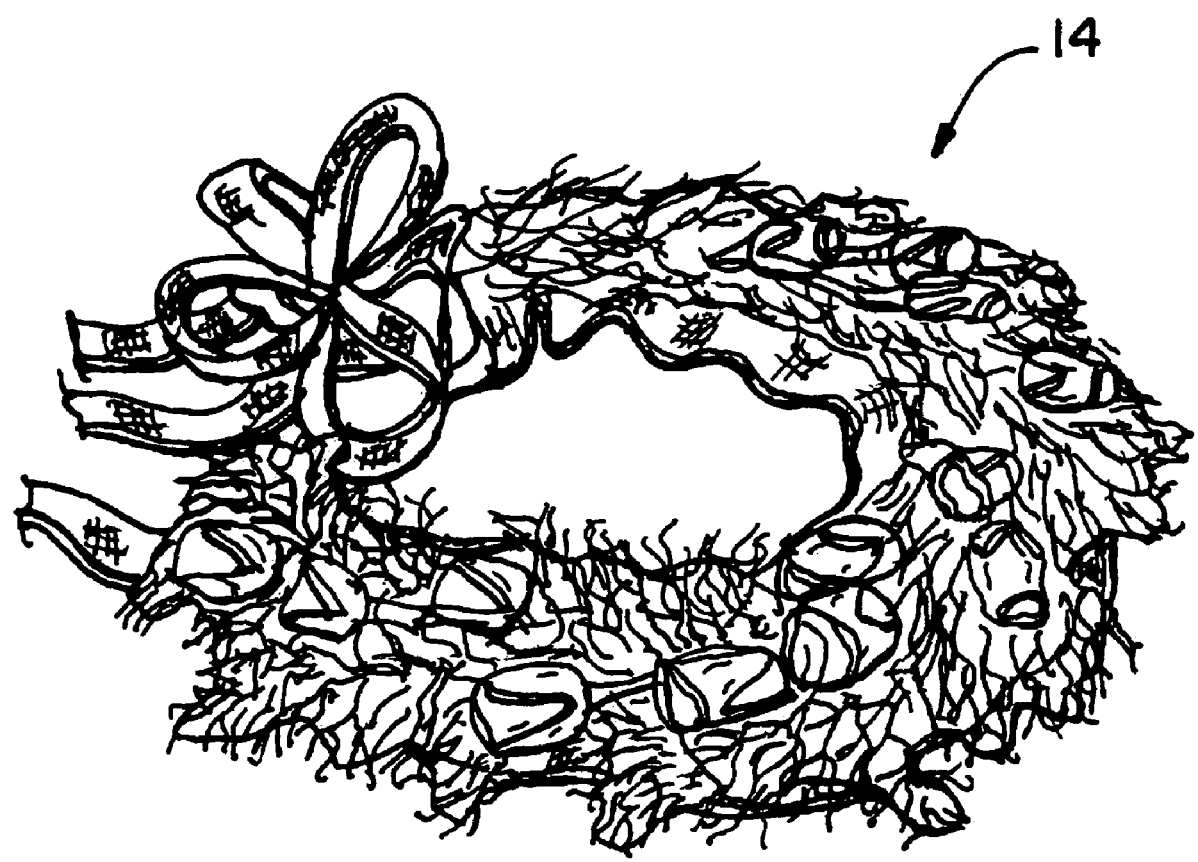
FIG. 7 is a perspective view of the finished floral halo.

FIG. 7 is a perspective view of the finished floral halo.

NUMERALS

Jig 1
Wood 2
Pin Group 3
Pins 3A, 3B, 3C
Butterfly Loop 4
Wings 4A, 4B
Central Support 5
End Loops 6
Floral Wire 7
Ribbon 8
Basting Stitch 9
Stapler 10
End Streamer 11
Bow 12
Flower Bundle 13
Floral Halo 14

OPERATION

A person making the decorative article of the present invention forms a central support 5 by bending a wire 7 about a jig 1 in order to create a central support 5 having a particular length with a plurality of butterfly loops 4 positioned longitudinally along the length thereof. The person bends the wire 7 about a center pin 3A within a pin group 3 and then bends the wire 7 around the left pin 3B in the pin group 3 and then bends the wire about the right pin 3C in the pin group 3 and back across the center pin 3A before bending the wire 7 around the center pin 3A of the next pin group 3 positioned longitudinally therealong. Once the central support 5 is removed from the jig 1, wire 7 is bent back across the point where the wire 7 was bent about pin 3A to strengthen the central support 5 at that point. This step is repeated for each completed butterfly loop 4.

Each flower bundle 13 comprises a main flower with a plurality of filler flowers and is positioned adjacent to each butterfly loop 4 and the person making the decorative article bends each wing 4A and 4B of the butterfly loop 4 about the flower bundle 13 stems thereby securing each flower bundle 13 to the central support 5. This step is repeated by placing the next successive flower bundle 13 on the central support 5 adjacent the next butterfly loop 4 in such a manner that each succeeding flower bundle 13 covers the bent wings 4A and 4B of the preceding butterfly loop 4 such that the bent butterfly loop 4 is hidden from view by the positioning of the next flower bundle 13. In the embodiment of a floral halo, a ribbon 8 having a length substantially equal to the length of the central support 5 is basted 9 along the length thereof such that the ribbon 8 is gathered and the central support 5 is fastened by stapling 10, sewing or gluing to the gathered ribbon 8 along the length thereof.

In accordance with the invention this process could be adapted to make a decorative article with is substantially longer than a floral halo. In this case the gauge of the wire would be greater and no ribbon would be required to give strength to the decorative article. These decorative articles could be a lei, a Christmas garland, a Christmas wreath, or any desired length that would rest on the back of chairs, a window, an archway, a chuppa, a dog collar or any place where decorations are used such as weddings or other special occasions.

The invention claimed is:

1. The method of making a decorative article having a plurality of distinct elements comprising the steps of:

providing a special jig having a length and comprising a plurality of pin groups positioned longitudinally along the jig length;

bending a wire on the jig to form a central support having a length and a plurality of butterfly loops positioned along said central support length, each butterfly loop comprising a pair of wings and corresponding to each pin group;

bending the ends of the central support to form an end loop at each end thereof;

positioning a first distinct element from said plurality of distinct elements upon the central support adjacent a first butterfly loop from said plurality of butterfly loops;

bending each wing of the first butterfly loop around the first distinct element thereby securing the first distinct element to the central support;

positioning a second distinct element from said plurality of distinct elements upon the central support adjacent a second butterfly loop from said plurality of butterfly loops;

bending each wing of the second butterfly loop around the second distinct element thereby securing the second distinct element to the central support in such a manner that the second distinct element covers the bent wings of the first butterfly loop;

sequentially positioning other distinct elements from the plurality of distinct elements upon the central support adjacent to other butterfly loops from the plurality of butterfly loops in such a manner that each successive distinct element covers a preceding butterfly loop along the length of central support.

2. The method of making a decorative article as set forth in claim 1, further comprising:

providing a ribbon having a length substantially equal to the length of said central support;

basting and gathering the ribbon to create a ruffled effect; fastening said central support to said ribbon.

3. The method of making a decorative article as set forth in claim 2, wherein said fastening of said central support to said ribbon is selected from the group consisting of stapling, gluing or sewing.

4. The method of making a decorative article as set forth in claim 3, wherein the decorative article is a floral halo and the plurality of distinct elements are flower bundles.

5. The method of making a decorative article as set forth in claim 2, further comprising fastening streamers to the end loops and fastening a bow to a final distinct element in order to complete the decorative article.

6. The method of making a decorative article as set forth in claim 1, wherein each pin group comprises a left pin, a middle pin and a right pin positioned in line and perpendicular to the axis of the jig length;

bending the wire about the middle pin, running the wire around the left pin, then running the wire around the right pin and then back around the middle pin to form a butterfly loop and then along the longitudinal axis of the jig length to the next pin group to make the next successive butterfly loop.

7. The method of making a decorative article as set forth in claim 6; further removing the central support from the jig and bending the wire back across itself to strengthen the central support.

8. The method of making a decorative article as set forth in claim 1; wherein each pin group comprises a left pin, a middle pin, and a right pin positioned in line and perpendicular to the axis of the jig length;

bending the wire around the middle pin, then running the wire around the right pin, then running the wire around the left pin and back around the middle pin to form a butterfly loop and then along the longitudinal axis of the jig length to the next pin group to make the next successive butterfly loop.

9. The method of making a decorative article as set forth in claim 8, further removing the central support from the jig and bending the wire back across itself to strengthen the central support.

* * * * *